United States Patent [19]

Bacskai

[11] 4,042,573
[45] Aug. 16, 1977

[54] SULFONIC ACID DERIVATIVES AS PROMOTERS FOR THE POLYMERIZATION OF 2-PYRROLIDONE

[75] Inventor: Robert Bacskai, Kensington, Calif.

[73] Assignee: Chevron Research Company, San Francisco, Calif.

[21] Appl. No.: 607,843

[22] Filed: Aug. 25, 1975

[51] Int. Cl.² .............................................. C08G 69/24
[52] U.S. Cl. ................................................. 260/78 P
[58] Field of Search ............................ 260/78 P, 78 L

[56] References Cited

U.S. PATENT DOCUMENTS 3,016,367  1/1962  Glickman et al. ................. 260/78 P Primary Examiner—Harold D. Anderson
Attorney, Agent, or Firm—Dix A. Newell; S. Russell LaPaglia

[57] ABSTRACT

Certain sulfonic acid derivatives function as promoters of the anionic polymerization of 2-pyrrolidone.

5 Claims, No Drawings

SULFONIC ACID DERIVATIVES AS PROMOTERS FOR THE POLYMERIZATION OF 2-PYRROLIDONE

BACKGROUND OF THE INVENTION

Alkyl and aryl sulfonic acids and esters have been suggested as stabilizing agents for certain polylactams, see U.S. Pat. No. 3,878,173. Several compounds have been suggested as activators or promoters of the anionic (i.e., alkaline-catalyzed) polymerization of 2-pyrrolidone to polypyrrolidone, including sulfonyl azetidinone, see U.S. Pat. No. 3,185,677. The N-acyl compounds, such as that obtained from the reaction of acetic anhydride with 2-pyrrolidone, are a typical class of polymerization promoters, see U.S. Pat. Nos. 2,809,958 and 3,681,295. N-acyl compounds also serve as co-activators of polymerization in the carbon dioxide-activated anionic polymerization of pyrrolidone, see U.S. Pat. Nos. 3,721,652 and 3,681,295. That is, they serve to promote polymerization, i.e., further increase the rate of polymerization, under conditions of carbon dioxide-activated polymerization. Although in general the N-acyl co-activators, like other co-activators, increase the rate of polymerization, they do so at the cost of showing minimal improvement or actual lowering of the viscosity (molecular weight) of the polymer produced.

SUMMARY OF THE INVENTION

The process of polymerizing pyrrolidone in the presence of an alkaline polymerization catalyst and a polymerization promoter which is a derivative of a sulfonic acid selected from among sulfonic acid anhydride, N-sulfonyl-2-pyrrolidone and sulfonyl halide.

DESCRIPTION OF PREFERRED EMBODIMENTS OF THE INVENTION

Sulfonic Acid and Derivatives

Sulfonic acid and its derivatives, their synthesis and chemical reactions are described in the Kirk-Othmer "Encyclopedia of Chemical Technology" 2nd edition, Interscience 1969 at Vol. 19, pages 279f. Sulfonic acids have the formula $RSO_2OH$. Sulfonic acid derivatives include, for example, the alkali metal sulfonates, $RSO_2OM$ wherein M is an alkali metal selected from among lithium, sodium, potassium, etc.; the sulfonic acid anhydrides, $(RSO_2)_2O$; sulfonyl compounds, $RSO_2X$ wherein X is, for example, a halogen; sulfonic esters $RSO_2OR^1$ wherein $R^1$ is derived from an alcohol; sulfonamides $RSO_2NHR^1$ and sulfonimides $(RSO_2)_2NF^1$, wherein $-NR^1$ is derived from an amine.

In the sulfonic acid derivatives which find use within the scope of the present invention, the R group in $RSO_2X$, or $(RSO_2)_2O$, etc. is selected from among alkyl or haloalkyl groups of from 1 to 20 carbon atoms, and aryl, aralkyl, haloaryl, alkaryl and haloalkaryl groups of from 6 to 30 carbon atoms. Halogen substituents are fluorine, chlorine, bromine and iodine, preferably fluorine and chlorine and most preferably fluorine. The alkyl, aryl, aralkyl and alkaryl groups may contain none, or several halogen substituents, and may even be perhalogenated, preferably perfluorinated. The alkyl groups may be straight chain or branched, cyclic or alicyclic. They include but are not limited to methyl, ethyl, propyl, butyl, hexyl . . . undecyl, dodecyl . . . stearyl . . . , etc., and all known branched and unbranched, cyclic and alicyclic geometric isomers of such groups. The aryl, aralkyl and alkaryl groups of from 6 to 30 carbon atoms include phenyl, tolyl, xylyl, diphenyl, etc., and any of the aforementioned halogen, haloalkyl or alkyl groups as one or more substituents in such aryl groups at any chemically available geometric position.

Sulfonic acids whose derivatives find use within the scope of this invention are exemplified but not limited to such sulfonic acids as methane sulfonic acid, mono-, di-, and trifluoromethane sulfonic acid, cyclohexane sulfonic acid, tetrachloroethane sulfonic acid, isohexane sulfonic acid, $C_{14}$–$C_{18}$ cracked wax alkane sulfonic acid, isobutane sulfonic acid, octadecane sulfonic acid, dodecane sulfonic acid, and other alkane and haloalkane sulfonic acids; benzene sulfonic acid, toluene sulfonic acid, chlorobenzene sulfonic acid, 2,6-diethylbenzene sulfonic acid, perfluorobenzene sulfonic acid and other alkane, arene, haloarene, alkarene, aralkane and haloalkarene sulfonic acids.

Derivatives of the aforementioned sulfonic acids which find use within the scope of the present invention include the sulfonic acid anhydride $(RSO_2)_2O$, the sulfonyl halide $RSO_2X$, and the N-sulfonyl-2-pyrrolidone $RSO_2N(CH_2)_3CO$. In the sulfonyl halide $RSO_2X$, X is fluorine, chlorine, bromine or iodine, preferably chlorine. Such sulfonic acid derivatives are exemplified by methane sulfonic acid anhydride, mono-, di- and trifluoromethane sulfonic acid anhydride (TFSA), toluene sulfonic acid anhydride, isobutane sulfonic acid anhydride, etc., etc., N-ethane sulfonyl-2-pyrrolidone, N-benzene sulfonyl-2-pyrrolidone, N-trifluoromethane sulfonyl-2-pyrrolidone, ethane sulfonyl chloride, difluoromethane sulfonyl bromide, p-chlorobenzene sulfonyl chloride, p-toluene sulfonyl chloride, etc.

Of the aforementioned derivatives of sulfonic acid, the sulfonic acid anhydride $(RSO_2)_2O$ and the N-sulfonyl-2-pyrrolidone are preferred, and of these the anhydride is most preferred. Halogenated anhydride is particularly preferred, such as fluoro- or chloroalkane sulfonic acid anhydride. The most preferred activator is trifluoromethane sulfonic acid anhydride (TFSA).

Polymerization of Pyrrolidone

Pyrrolidone polymerizes under anionic polymerization conditions preferably in the presence of a polymerization activator such as carbon dioxide. The sulfonic acid derivatives used in the process of the present invention are promoters of pyrrolidone polymerization. Anionic polymerization conditions are achieved, for example, by contacting 2-pyrrolidone with a source of alkaline polymerization catalyst such as an alkali metal or alkali metal derivative such as a hydroxide or an alkoxide, preferably a sodium or potassium derivative, and usually potassium hydroxide. Potassium hydroxide, for example, reacts with 2-pyrrolidone to produce the catalyst potassium pyrrolidonate, and the water of reaction is removed. The catalyst may be made in the presence of excess 2-pyrrolidone which is subsequently polymerized, or the catalyst may be isolated and added to 2-pyrrolidone, or a catalyst solution may be added to 2-pyrrolidone. Polymerization proceeds under conditions of bulk, or dispersion polymerization for a period of from about 4 to about 100 hours at temperatures of from about 15° C to about 100° C.

Other 5–7 membered-ring lactams such as caprolactam may be used as a source of alkaline polymerization catalysts and other alkaline materials such as guaternary ammonium bases and alkaline earth metal compounds may also be used as sources of alkaline polymerization catalysts.

The yield of polypyrrolidone is substantially improved if polymerization takes place in the presence of a polymerization promoter. The aforementioned sulfonic acid derivatives are particularly suitable for this purpose. The addition of sulfonic acid derivatives to the reaction mixture (the polymerizate), or to the catalyst, normally takes place under substantially anhydrous conditions, i.e., if KOH is the source of polymerization catalyst, the sulfonic acid derivative is added to the dehydrated catalyst, or the dehydrated polymerizate.

Preferably the process of the present invention is carried out in the presence of an activator of polymerization which is carbon dioxide and/or sulfur dioxide, most preferably carbon dioxide, and the sulfonic acid-derived polymerization promoter is relegated to the role of co-activator. The advantage of this process is that while carbon dioxide does promote the polymerization (increases the rate of formation of polypyrrolidone) it also increases the molecular weight of the polypyrrolidone formed; however it does not accelerate the rate of polymerization as much as the highest commercial efficienty would demand. Carbon dioxide is thus chiefly valued for the melt-spinnable high molecular weight polypyrrolidone it is capable of producing by activation of the anionic polymerization of 2-pyrrolidone, see U.S. Pat. No. 3,721,652. Unexpectedly, it is now found that the sulfonic acid-derived promoters in the process of the present invention are capable of accelerating the rate of carbon dioxide-activated polymerization without an appreciable decrease in the molecular weight of the polypyrrolidone produced.

In the usual method of making polypyrrolidone, the alkaline polymerization catalyst is prepared in situ with the monomer to be polymerized as by the addition of less than an equivalent amount of a source of alkali metal to 2-pyrrolidone. Carbon dioxide is then added to the mixture. As an alternative to the in situ method, it is also possible to make and to separate an adduct of carbon dioxide and the catalyst. The adduct is then added to the reaction mixture to effect polymerization. The total alkaline polymerization catalyst system comprises from about 0.5 to 30 mol percent, or higher, of the monomer catalyst mixture based on total monomer. Total monomer consists of 2-pyrrolidonate catalyst, 2-pyrrolidone provided as solvent for said catalyst, 2-pyrrolidonate catalyst having formed an adduct with the carbon dioxide and any additional monomer charged to the reactor. Preferably about 5–20 mol percent and most preferably about 10 mol percent catalyst, based on total monomer, is used.

A polymerization activator such as carbon dioxide and/or sulfur dioxide is normally used in a polymerization-activating amount, i.e., an amount sufficient to effect substantial conversion and reasonable yields of high viscosity polymer in a reasonable period of time. Normally about 0.02–10 mol percent of carbon dioxide based on total monomer is preferred and about 1–5 mol percent is most preferred.

When used as promoters of polymerization, or when used as co-activators of polymerization, the sulfonic acid derivatives of the process of the present invention are used in promoting or co-activating amounts, i.e., amounts sufficient to increase the rate of polymerization over the rates obtainable in its absence. The sulfonic acid promoters or co-activators of the process of the present invention are preferably used in amounts of from about 0.01 mol percent to about 5 mol percent based on total monomer, and preferably from about 0.1 mol percent to about 1 mol percent.

2-pyrrolidone may be polymerized at a temperature of from about 15° to about 100° C, preferably 25° to about 70° C and most preferably from about 40° to about 60° C, under a pressure ranging from subatmospheric to superatmospheric, in the presence of the alkaline polymerization catalyst for a period of from about 4 to 100 hours or longer, preferably from about 8 to about 72 hours, and more preferably from about 8 to 48 hours. The reaction mixture is preferably substantially anhydrous.

In order to produce high-quality poly-2-pyrrolidone capable of being formed into fibers, filaments and yarn of commercial textile quality, it is necessary that the 2-pyrrolidone monomer be of high purity. Depending upon the process of manufacture, commercially available 2-pyrrolidone may contain appreciable amounts of various impurities, some of which are believed to interfere deleteriously with polymerization. Purification of the monomer to polymerization-grade is achieved by crystallization, distillation, distillation from a boron oxide, aqueous caustic hydrolysis and distillation, etc., etc., as disclosed in the art. The process of the present invention is just as applicable to the production of polymers of C-alkyl-substituted pyrrolidone, such as 4-methyl-2-pyrrolidone, and copolymers of 2-pyrrolidone, such as with caprolactam, as to the production of poly-2-pyrrolidone. Consequently, in general, and unless otherwise indicated, "monomer" denotes 2-pyrrolidone, substituted 2-pyrrolidone, and any compound capable of copolymerizing with 2-pyrrolidone under the stated conditions of alkaline polymerization catalysis.

Preparation of polymers of pyrrolidone according to the normal process of this invention can be carried out with various amounts of monomers, catalysts, inert non-solvent liquids, initiators, activators, co-activators, promoters, and other additives — the amount of each being properly coordinated to produce the most effective polymerization. Although the preferred amounts of the components in the reaction have been given, it is to be understood that these are not intended to be limitation to polymerization since it may be possible to effect substantial polymerization outside the preferred ranges.

EXEMPLIFICATION

EXAMPLE 1

A 500-ml flask equipped with a thermometer-stirrer, a gas inlet tube and a side-arm take-off with condenser was charged with 199 g (2.35 mols) of 2-pyrrolidone and 15.5 g (0.235 mol) of 85% KOH. After dissolution was complete, the contents of the flask were heated to 110° C under 1 mm Hg pressure to remove the by-product water. The solution was then cooled to 25° C and $CO_2$ was added until the solution contained 3 mol percent $CO_2$, based on monomer. The resulting solution was stirred for 2 minutes and then poured into 4 polyethylene bottles, each holding approximately 50 g. The bottles were placed in an oven at 50° C. A bottle was removed and worked up after 4, 8, 12 and 22 hours, respectively. The work-up consisted of cutting off the plastic bottle, chopping the polymer into small pieces and extracting 3 times with water. After drying, the polymer was weighed and its viscosity determined.

Monomer conversions were 6, 14.4, 23.7 and 48.3% at 4, 8, 12, and 22 hours, respectively. Gardner viscosities were M, U—V, X—Y and $Z_1$, respectively, for the same samples.

EXAMPLE 2

Example 1 was repeated except that trifluoromethane sulfonic acid anhydride (TFSA), 133 mg (0.02 mol percent based on monomer), was added after the $CO_2$ was bubbled in. Other experiments were carried out with 233 mg (0.035 mol percent); 342 mg (0.05 mol percent); 684 mg (0.10 mol percent); 1.33 g (0.20 mol percent); and 1.0 g (0.15 mol percent), of TSFA. The results are given in Table I as percent conversion and viscosity after 22 hours at 50° C.

EXAMPLE 3

The same procedure was followed except that the TFSA was replaced by an equal mol percent of acetic anhydride. Acetic anhydride is known to form N-acetylpyrrolidone under these conditions. The results of these experiments are also given in Table I as percent conversion and viscosity after 22 hours at 50° C.

TABLE I

Co-Activated Polymerization of 2-Pyrrolidone

| $Ac_2O$ Mol % | TFSA Mol % | Percent Conversion | Gardner Viscosity |
|---|---|---|---|
| 0 | 0 | 48 | $Z_1$ |
| 0 | 0.02 | 58 | $Z$-$Z_1$ |
| 0.02 | 0 | 56 | X-Y |
| 0 | 0.035 | 59 | Y-Z |
| 0.035 | 0 | 58 | W-X |
| 0 | 0.05 | 60 | X |
| 0.05 | 0 | 64 | I-J |
| 0 | 0.10 | 61 | W |
| 0.10 | 0 | 65 | H |
| 0 | 0.15 | 59 | V |
| 0 | 0.20 | 60 | I-J |

In Table I, it will be observed that as the quantity of co-activator (TFSA or acetic anhydride) is increased, the percent conversion of monomer to polymer is also increased. However, with acetic anhydride as the co-activator, the molecular weight, as measured by viscosity, of the polymeric product decreases rapidly with increasing amounts of anhydride, reaching a Gardner viscosity of H at 0.1 mol percent acetic anhydride. With TFSA, on the other hand, the molecular weight is still high at the 0.1 mol percent concentration. These results indicate that TFSA can be used to promote polymerization to 60% conversion or higher at 22 hours and 50° C without a concommitant substantial loss in molecular weight (viscosity).

EXAMPLE 4

Using the same apparatus as in the previous examples, the flask was charged with 200 g (2.35 mols) of 2-pyrrolidone and 15.5 g (0.235 mol) of 85% KOH. The resulting solution was heated at 118° C and 1.2 mm Hg pressure for 17 minutes to remove water. The anhydrous solution was then divided into 6 portions of about 30 g each which were placed in polyethylene bottles along with 1 and 2 mol percent each of acetic anhydride, trifluoroacetic anhydride and trifluoromethane sulfonic acid anhydride (TFSA). The polymerization of the contents of the polyethylene bottles was carried out for 22 hours at 50° C. After 22 hours, the samples were worked up as in previous examples. The conversions varied from 10 to 25%, and in all cases the viscosity on the Gardner scale was less than A, indicating a low-molecular-weight product is formed in low yield without the presence of a polymerization activator such as $CO_2$.

TABLE II

Polymerization Time and Polymer Viscosity at 50% Conversion of 2-Pyrrolidone

| $Ac_2O$ Mol % | TFSA Mol % | Hours to about 50% Conversion | Viscosity at 50% Conversion |
|---|---|---|---|
| 0 | 0 | 22 | $Z_1$ |
| 0 | 0.02 | 18 | Y-Z |
| 0.02 | 0 | 15 | W-X |
| 0 | 0.035 | 16.5 | Y-Z |
| 0.035 | 0 | 11 | U |
| 0 | 0.05 | 13 | X |
| 0.05 | 0 | 7 | G-H |
| 0 | 0.10 | 11 | V |
| 0 | 0.15 | 14 | U-V |
| 0 | 0.20 | 5.5 | I-J |

The superiority of sulfonic acid derivatives over N-acetylpyrrolidone as co-activators of 2-pyrrolidone polymerization is also shown in Table II. Table II shows the time to 50% conversion of monomer to polymer, and the viscosity of the polymer at that time in polymerizations performed at 3 mol percent $CO_2$/10 Lk mol percent potassium catalyst and with the amounts of acetic anhydride and TFSA shown. The sulfonic acid anhydride is found to produce higher-molecular-weight polymer at the same level as acetic anhydride, but to still reduce the time necessary to achieve 50% conversion. The very rapid fall-off in molecular weight with small increments in acetic anhydride makes acetic anhydride a disadvantageous co-activator for controlling the rate of polymerization in comparison with the sulfonic acid derivative.

Polymer viscosity is measured at room temperature (about 25° C) on the Gardener Viscosity Scale using a Gardner-Holdt Bubble Viscometer. 0.5 g of polymer is dissolved in 10 ml of concentrated formic acid (90% by weight HCOOH, 10% water). The polymer solution is compared in viscosity to the Gardner Bubble Standards, e.g., Standard U corresponds to 6.27 stokes, Standard Z corresponds to 22.7 stokes ("Physical and Chemical Examination, Paints, Varnishes, Lacquers and Colors" by H. A. Gardner and G. G. Sward, 12th Ed., 1962, distributed by Gardner Laboratory Company, Inc., Bethesda, Md.).

What is claimed is:

1. A process for polymerizing 2-pyrrolidone to fiber-forming polypyrrolidone which comprises forming a mixture of 2-pyrrolidone, an alkaline polymerization catalyst, carbon dioxide polymerization activator, and trifluoromethane sulfonic acid anhydride polymerization promoter, and subjecting said mixture to a temperature of about 15°–100° C under substantially anhydrous conditions.

2. The process for polymerizing 2-pyrrolidone according to claim 1 wherein said alkaline polymerization catalyst is selected from the group consisting of alkali metal lactamates and ammonium lactamates of 5-7 membered-ring lactams.

3. A process for polymerizing 2-pyrrolidone according to claim 2 wherein said lactamate is potassium or sodium pyrrolidonate.

4. A process for polymerizing 2-pyrrolidone according to claim 1 wherein said anhydride is present in amounts of about 0.01-5 mol percent based on total monomer.

5. The process of polymerizing 2-pyrrolidone according to claim 1 where said trifluoro methane sulfonic acid anhydride is present in amounts from about 0.01-1 mol percent based on total monomer.

* * * * *

UNITED STATES PATENT AND TRADEMARK OFFICE
CERTIFICATE OF CORRECTION

PATENT NO. : 4,042,573
DATED : August 16, 1977
INVENTOR(S) : Robert Bacskai

It is certified that error appears in the above-identified patent and that said Letters Patent are hereby corrected as shown below:

Col. 1, line 51, "$(RSO_2)_2NF'$" should read --$(RSO_2)_2NR'$--.

Col. 2, line 68, "guaternary" should read --quaternary--.

Col. 3, line 25, "efficienty" should read --efficiency--.

Col. 6, line 21, "$CO_2/10$ Lk" should read --$CO_2/10$--.

Col. 6, line 66, "0.01-1 mol" should read --0.1-1 mol--.

Signed and Sealed this

Seventh Day of March 1978

[SEAL]

Attest:

RUTH C. MASON
*Attesting Officer*

LUTRELLE F. PARKER
*Acting Commissioner of Patents and Trademarks*